United States Patent [19]

Nagazumi

[11] Patent Number: 4,759,034
[45] Date of Patent: Jul. 19, 1988

[54] MULTI-STEP SPREAD SPECTRUM COMMUNICATION APPARATUS

[75] Inventor: Yasuo Nagazumi, Tokyo, Japan

[73] Assignee: General Research of Electronics, Inc., Tokyo, Japan

[21] Appl. No.: 937,109

[22] Filed: Dec. 2, 1986

[51] Int. Cl.$^4$ .............................................. H04B 7/02
[52] U.S. Cl. ......................................... 375/1; 380/34
[58] Field of Search .............. 371/1; 364/717; 380/34, 380/46; 331/78

[56] References Cited

U.S. PATENT DOCUMENTS

| | | | |
|---|---|---|---|
| 3,665,472 | 5/1972 | Kurtchner et al. | 375/1 |
| 3,706,933 | 12/1972 | Bidell et al. | 325/479 |
| 3,808,536 | 4/1974 | Reynolds | 371/1 |
| 4,225,935 | 9/1980 | Zscheile, Jr. et al. | 375/1 |
| 4,241,447 | 12/1980 | Epstein | 371/1 |
| 4,255,791 | 3/1981 | Martin | 371/1 |
| 4,308,617 | 12/1981 | German, Jr. | 371/1 |
| 4,475,215 | 10/1984 | Gutleber | 375/1 |
| 4,494,238 | 1/1985 | Groth, Jr. | 375/1 |
| 4,538,281 | 8/1985 | Rajan | 375/2.2 |
| 4,597,087 | 6/1986 | Kadin | 375/1 |
| 4,606,039 | 8/1986 | Nicolas et al. | 375/1 |
| 4,607,375 | 8/1986 | Lee | 375/1 |

Primary Examiner—Salvatore Cangialosi
Attorney, Agent, or Firm—Trexler, Bushnell, Giangiorgi & Blackstone, Ltd.

[57] ABSTRACT

In a pseudo-random communication system, a transmitter-generated encoded signal is to be correlated with a receiver-generated similarly encoded signal for recognizing synchronization of the transmitted and received signals in the presence of undesired received energy. The system comprises a spread-spectrum transmitter including at least two pseudo-noise generators for producing at least two pseudo-noise signals which are related in a predetermined fashion, a mixer for receiving and mixing the two pseudo-noise signals with respective carrier and information signals to produce an output signal, and apparatus for transmitting the output signal. The system also includes a spread-spectrum receiver comprising a correlator and a matched filter coupled in circuit to form a synchronization detector circuit for receiving and detecting the encoded output signal transmitted by the transmitter so as to recover the information therefrom. The correlator includes at least one pseudo-noise generator for producing pseudo-noise signals related in a predetermined fashion to the pseudo-noise signals produced by the transmitter pseudo-noise generators and a mixer for mixing the pseudo-noise signals with the received encoded output signals and coupled in circuit with the matched filter circuit.

21 Claims, 7 Drawing Sheets

MULTI-STEP SPREAD SPECTRUM COMMUNICATION APPARATUS

BACKGROUND OF THE INVENTION

This invention relates to direct sequence type (DS) spread spectrum (SS) communications systems. More particularly, the invention relates to such a communications systems which employs a novel and simplified encoding and decoding system so as to greatly simplify and economize the construction and operation thereof.

Spread spectrum type communication systems are generally characterized by use of a relatively large transmission bandwidth as compared to the bandwidth of the information to be transmitted. The remaining transmission bandwidth is utilized to accomplish a relatively broad-band encoding arrangement for encoding of the information. Accordingly, in order to recover the information from the transmitted signal, it is necessary to have a corresponding decoder system.

Such systems and techniques are often also known as pseudo-random or pseudo-noise communications systems or techniques. Such communications systems are utilized for such purposes an anti-jamming, or privacy, and/or receiver selection in systems utilizing plural receivers operating on a single carrier frequency.

An example of the latter type of system is one in which information may be selectively transmitted to one or more designated receivers within a multiple receiver communication system. Each of the receivers is assigned a predetermined and different code. The transmitter selectively transmits information recoverable by any of the individual receivers by modulating the transmitted signal with the same code as that assigned to the selected receiver or receivers. Each receiver in turn matches its reference code in phase with the transmitted code to permit demodulation of the transmitted information. In this manner, selected information can be transmitted to a given receiver while preventing recovery of the same information by other receivers in the same communication system.

Conversely, such systems may also be utilized to permit a receiver to select information from among a plurality of transmitters operating on the same carrier frequency, by the same code matching procedure.

While a variety of spread spectrum techniques have been utilized, all are characterized by at least the following two factors: (1) The transmitted bandwidth is much greater than the bandwidth of the information being transmitted; and (b 2) Some signal form or function other than the information being transmitted is additionally utilized to modulate the transmitted signal.

A number of problems have arisen in such spread spectrum systems. For example, since a relatively broad bandwidth is being utilized, interference from spurious signals, noise and the like over a similarly broad band may hinder proper reception, demodulation and decoding of the transmitted signal. Additionally, some means must be provided to keep the code signal generator of the receiver in synchronization with the corresponding code signal generator of the transmitter to assure proper reception and decoding of the desired information. In such instances, synchronizer arrangements are used both to compensate for timing errors between the transmitter and receiver code generators, as well as for changes in signal path distances and the like which may occur due to variations in ionosphere or Doppler velocities.

Moreover, during reception and acquisition of a transmitted signal at a receiver, autocorrelation of the transmitted signal and receiver reference signal often produces unwanted autocorrelation side lobes. The effect of any high degree of correlation between simultaneously transmitted codes and the receiver reference is to increase the false correlation rate of the receiver (that is, the number of false indications of transmitter and receiver reference code phase synchronizations). This in turn causes spurious signal correlations and interferes with the proper decoding and recovery of the desired information.

In an effort to overcome such spurious signal correlations, the codes utilized are generally selected to minimize both cross-correlation levels and auto-correlation side lobes. Such codes may be selected by various methods of signal analysis, such as the so called Gold code, described in the article entitled "Optical Binary Sequences for Spread Spectrum Multiplexing" in the *I.E.E.E. Transactions on Information Theory*, volume IT-13, pages 619–621, dated October 1967.

However, in present day digital communications equipment, such codes are digitally generated, such that code simplification is desirable in order to minimize circuit complexity and cost. That is, relatively complex codes which often use several thousand bits of information for modulation or demodulation require relatively complex and expensive digital circuitry for their generation and processing in both the modulation and demodulation processes necessary for transmission and reception, respectively. Moreover, such large codes require a relatively higher "chip rate" or rate of code generation in order to effectively modulate typical information signal frequencies. However, the effective available chip rate is strongly restricted by the limited frequency characteristics of available RF circuit components and antenna apparatus.

The aforementioned Gold code as well as the so-called syncopated pseudo-noise generation methods utilize more than one pseudo-noise signal or code to increase the code complexity and effective chip rate compatible with existing RF equipment. Advantageously, however, we have discovered a different technique for combining pseudo-noise signals in such a manner as to obtain an apparently greatly increased spectrum of the transmission similar to that obtained with the foregoing methods without increasing the pseudo-noise code length. Moreover, our technique and related system can be configured to prevent unauthorized reception which may occasionally occur even in some of the prior art Gold code or other modulation systems. Such unauthorized reception may occur by use of a high performance synchroscope or other comparable tool at a point relatively close to the transmitter antenna. However, our technique and system makes such unauthorized reception by such tools or other means extremely difficult or even impossible, while yet requiring no increase in the length of the pseudo-noise codes utilized.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawing in which like references numerals identify like elements, and in which:

DETAILED DESCRIPTION OF THE ILLUSTRATED EMBODIMENT

Figure 1:
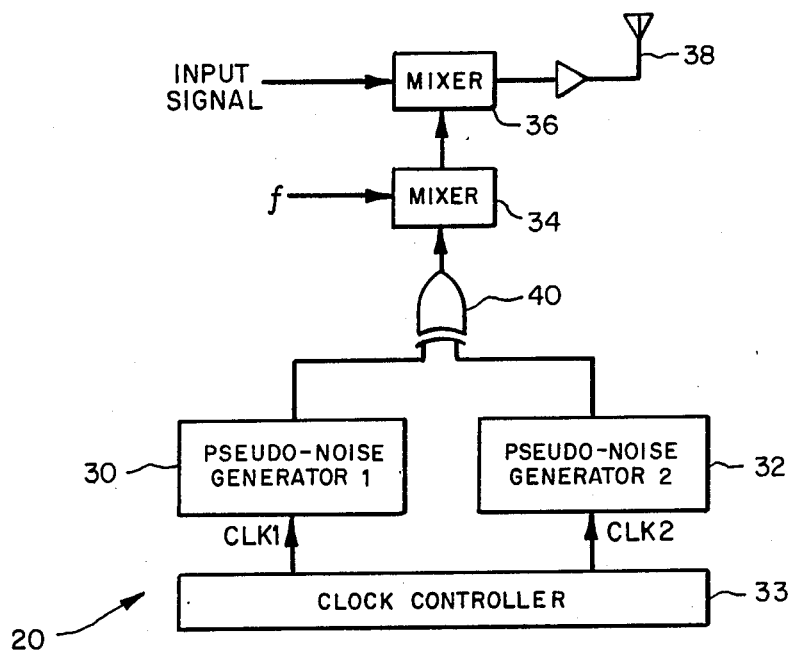
FIG. 1 is a block diagram of a transmitter portion of a communication system in accordance with the invention.
Figure 2:
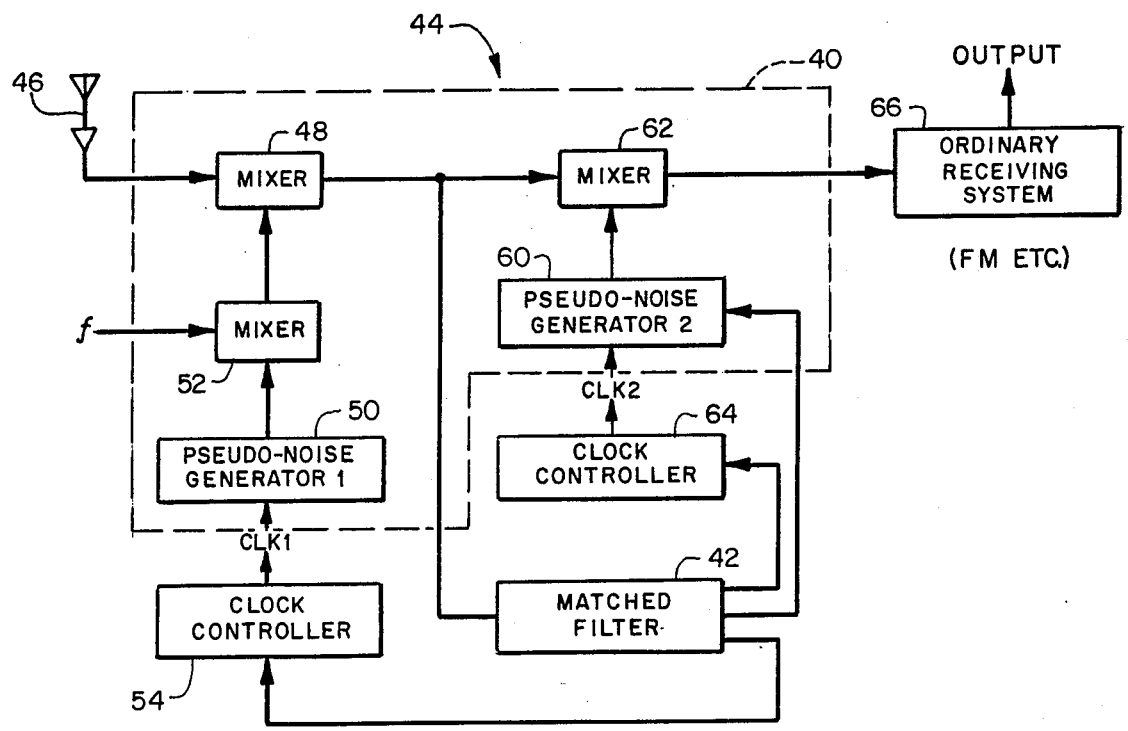
FIG. 2 is a block diagram of a receiver portion of a communication system of the invention.
Figure 3:
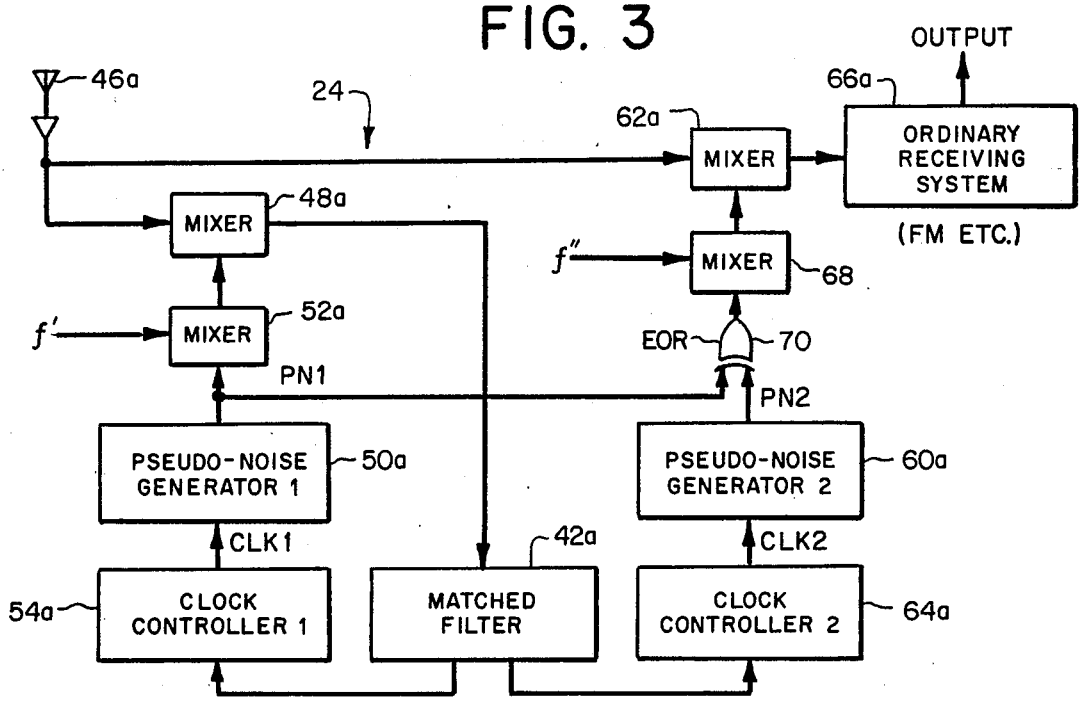
FIGS. 3 and 4 are block diagrams of two further embodiments of receiver portions of a communication system in accordance with the invention.
Figure 4:
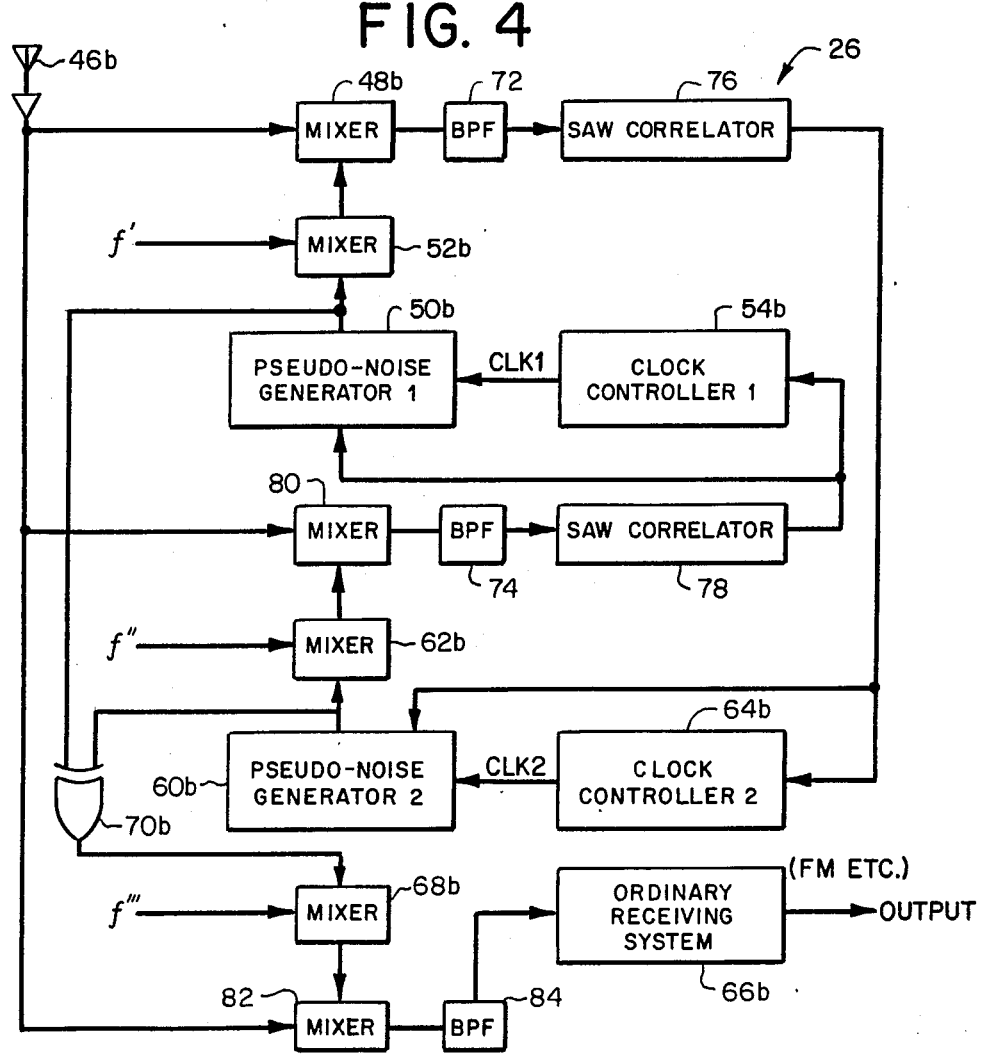

Referring now to the drawings and initially to FIGS. 1 through 4 a pseudo-random communication system or multi-steps spread spectrum communication system in accordance with the invention comprises a transmitter portion and a receiver portion. One embodiment of a transmitter portion in accordance with the invention is shown in FIG. 1, while respective embodiments of receiver portions are shown in FIGS. 2, 3 and 4. The transmitter circuit of FIG. 1 is designated generally by the reference numeral 20, while the receiver circuits of FIGS. 2, 3 and 4 are designated generally by respective reference numerals 22, 24 and 26.

In the system according to the invention, a transmitter-generated encoded signal is to be correlated with a receiver-generated similarly encoded signal for recognizing synchronization of the transmitted and received signals in the presence of undesired received energy, such as noise, interference or the like. Accordingly, the system comprises a spread-spectrum transmitter such as transmitter 20 which includes at least two pseudo-noise generator circuits 30, 32 for producing at least two pseudo-noise signals which are related in a predetermined fashion in accordance with the invention. The desired relationship of the two pseudo-noise signals produced by generators 30 and 32 in accordance with the invention will be more fully explained hereinbelow.

Mixing means, which in the embodiment of FIG. 1 include mixer circuits 34 and 36 combine or mix the pseudo-noise signals from generators 30 and 32 with a carrier frequency f and an input or "information" signal respectively to produce a modulated output signal for transmission by antenna 38. In the illustrated embodiment, a further combining circuit, here illustrated as an exclusive-OR circuit 40 is further interposed intermediate the pseudo-noise generators 30 and 32 and mixer 34 for combining the two pseudo-noise signals. A clock controller circuit 33 drives the two pseudo-noise generators 30, 32 with respective clock signals CLK1 and CLK2.

In the receiver circuit in accordance with the invention, and referring initially to the circuit 22 of FIG. 2, a correlator circuit means desiqnated generally by reference numeral 40 and matched filter circuit means 42 are coupled in circuit to form a synchronization detector circuit means. This latter circuit, designated generally by reference numeral 44, operates for receiving and detecting or decoding the encoded output signal transmitted by the transmitter circuit 20 so as to recover the information therefrom. To this end, a receiving antenna 46 is coupled with an input of the receiver circuit 22 which in the embodiment of FIG. 2 comprises the input of a first mixer circuit 48. The correlator circuit means 40 includes at least one pseudo-noise generator 50 for producing pseudo-noise signals or codes related in a predetermined fashion to the pseudo-noise signals produced by the generators 30 and 32 of the transmitter circuit 20.

The correlator circuit means 40 further includes at least one mixer means, which here includes the mixer circuit 48 and a second mixer circuit 52, for mixing the pseudo-noise signal from generator 50 with the received encoded output signals, and this mixer means being further coupled in circuit with the matched filter circuit 42. More specifically, it will be seen that in the embodiment of FIG. 2 an output of mixer circuit 48 is coupled with an input of matched filter circuit 42 which has three outputs to be described presently. In the embodiment of FIG. 2, the mixer circuit 52 receives the same carrier signal frequency f as utilized in the transmitter circuit 20, to accomplish demodulation or decoding of the encoded modulated output signals transmitted at antenna 38 and received at antenna 46.

Referring still to FIG. 2, the correlator circuit 40 preferably comprises a sliding correlator circuit which includes at least one pseudo-noise generator 50 and one mixer 52 as described above. Moreover, the generator 50 is adapted to produce or generate pseudo-noise signals in accordance with a clock signal (CLK1) applied thereto by a clock controller circuit 54. To this end, the clock controller circuit 54 is further controlled by one of the aforementioned outputs of the matched filter circuit 42. In the embodiment of FIG. 2, the correlator or sliding correlator circuit 40 also includes a second, similar pseudo-noise generator 60 and corresponding mixer 62 which receive a clock signal input (CLK2) from a second clock controller circuit 64. The second pseudo-noise generator and clock controller are coupled to receive signals from the remaining two outputs of the matched filter circuit 42. The mixer 62 mixes the pseudo-noise signal from generator 60 with the output of mixer 48 to accomplish further decoding of the encoded received signal from antenna 46 and feeds the resulting "decoded" signal to the input of an oridinary receiving system, which may be an FM or other radio receiving system or arrangement, as indicated generally at reference numeral 66, for demodulation and reproduction of the information or input signal.

Other specific configurations of receiver circuits may be utilized without departing from the invention. Two additional embodiments of receiver circuits 24 and 26, are respectively illustrated in FIGS. 3 and 4. However, prior to further description of the circuits of the invention, it will be constructive to refer briefly to FIGS. 5, 12 and 13 for an explanation of the generation of a spread-spectrum signal, and the generation of a pseudo-noise encoding signal for the spread-spectrum communications system of the invention, in accordance with the novel principle which we have discovered.

Figure 5:
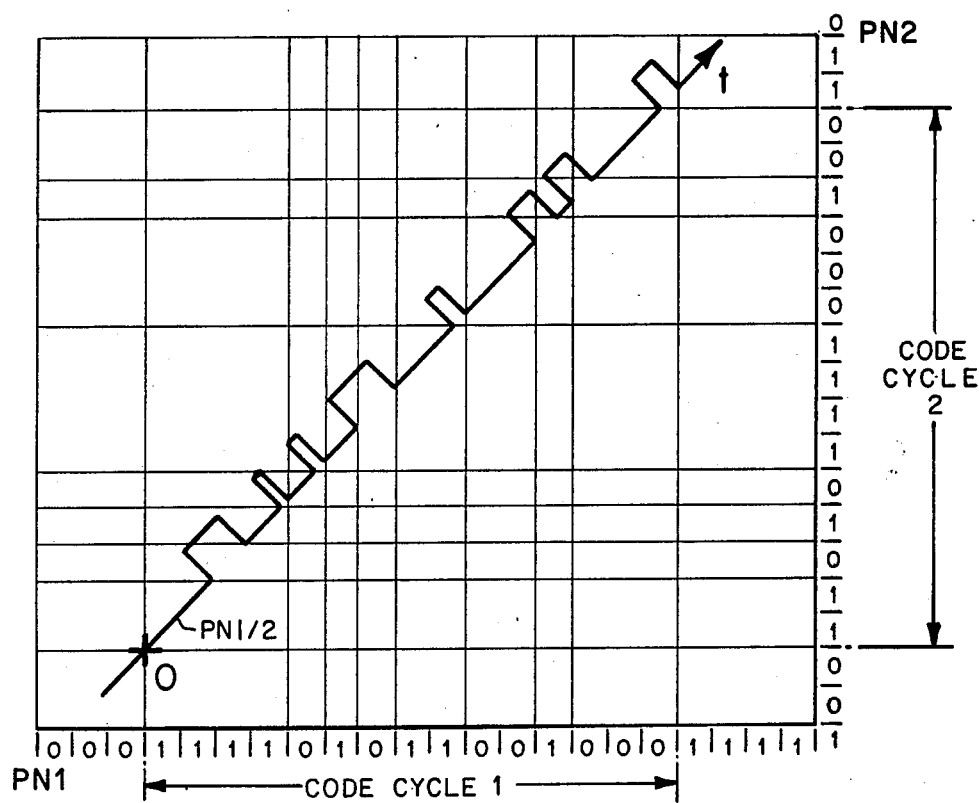
FIG. 5 is a timing chart, illustrating a pseudo-noise generation technique utilized in the system of the invention.

Referring initially to FIG. 5, the two pseudo-noise generator circuits 30 and 32 of transmitter 20, as well as corresponding pseudo-noise generators 50, 60 of receiver circuit 22 generate codes of the general form exemplified by the two or thogonal axes of the graph of FIG. 5 and labeled therein as code cycle 1 (PN1) and code cycle 2 (PN2). In accordance with the invention, we have discovered that two such cyclical codes or pseudo-noise signals of a given form and with a given relationship between their chip rates and/or circulation rates, may be combined to form a signal of the form illustrated across a diagonal of the graph of FIG. 5 as indicated generally by reference character PN1/2. In the embodiment illustrated in FIG. 5, the code cycles PN1 and PN2 are of a 15-bit length and comprise M-series codes which are generated by clocks or clock controller signals (CLK1 and CLK2 in FIGS. 1 and 2) which are frequency related in the following fashion; CLK1=(29/30) CLK2. Other ratios may be used without departing from the invention. The form of the desired signals is given more completely hereinbelow.

Figure 12:
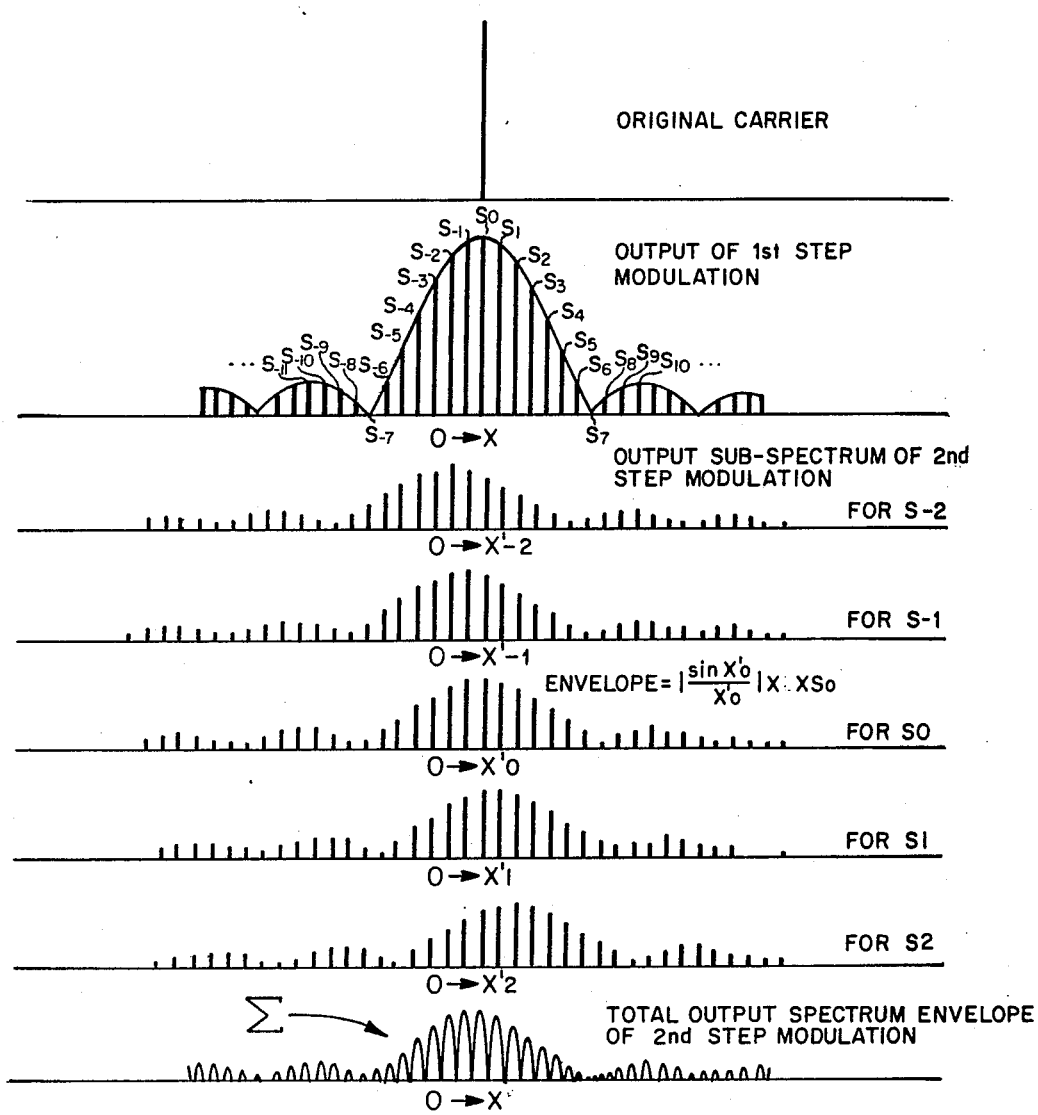
FIGS. 12 and 13 are graphical representations of spread-spectrum signal transmissions produced in accordance with the technique of the present invention.

Moreover, we have found that if the two pseudo-noise codes are combined by exclusive OR logic, the resultant signal PN1/2 may be represented as shown, generally along a diagonal or t-axis. We have found that signals modulated by this type of a pseudo-noise signal demonstrate a similar spectrum distribution to direct sequence (DS) type spread-spectrum (SS) signals produced by considerably more complex and expensive means. Referring briefly in this regard to FIG. 12, the spectrum distribution of the single-frequency original carrier signal is indicated generally in the top-most graph. The next graph therebelow indicates generally the spectral distribution of the first step modulation of the carrier signal including side lobes. The next five succeeding graphs indicate additional steps of both positive and negative sinusoidal modulation of signals having the indicated sub-spectrums, and the final or bottommost graph indicates the sum of the preceding steps of modulation and the resultant spread spectrum envelope distribution.

Figure 13:
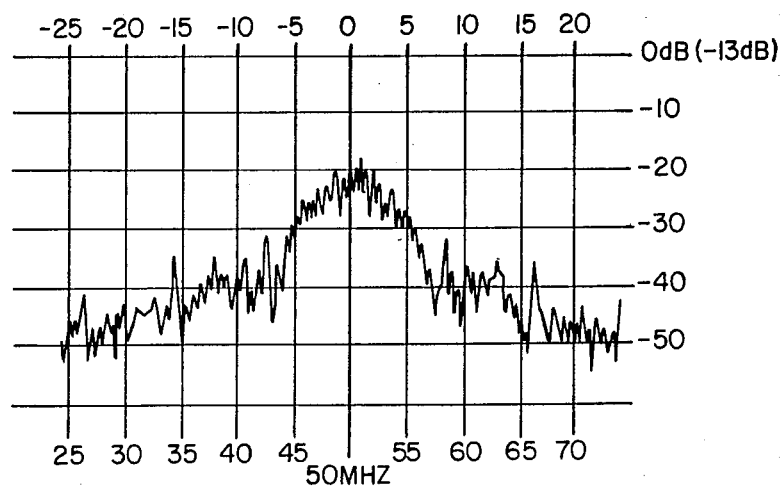

FIG. 13 is a graphic representation of an actual spectroscopic display of a carrier signal modulated in accordance with the method of the invention, and as illustrated in FIG. 12.

Generally speaking, we have discovered that the desired spread spectrum type of modulation and encoding may be accomplished by the use of pseudo-noise signals whose code circulation periods and mean chip times are related in the following fashion:

$$0.2 \leq \eta \leq 1.5$$

Where $\eta = \dfrac{|Tpc1 - Tpc2|}{\left(\dfrac{Tc1 + Tc2}{2}\right)} = \dfrac{\text{difference between two PN code circulation periods}}{\text{mean chip time}}$ or, even more generaly:

$$\eta = \dfrac{|M1 Tpc1 - M2 Tpc2| \times 2}{\left(\dfrac{n1 Tc1 + n2 Tc2}{(n1 + n2)}\right)(M1 + M2)}$$

Where M1, M2, n1 and n2 are all independent integers, equal to 1, 2 or 3. (the first equation is for M1=n1=1) and where
Tc1 and Tpc1 are the chip time and code circulation period for PN1,
Tc2 and Tpc2 are the chip time and code circulation period for PN2.

Hence, the example illustrated in FIG. 5 is exemplary of one particular set of codes falling within the foregoing definition. We have found that with pseudo-noise code circulation rate and mean chip times as defined by the above ranges or values of the factor $\eta$ we are able to generate effective beat code signals for modulation of a multiple-step, spread-spectrum system.

Referring again briefly to FIGS. 3 and 4, the alternative forms of receiver circuits 24 and 26 illustrated therein will be briefly described. Initially, the components of receiver 24 of FIG. 3 will be designated by similar reference numerals to the like components illustrated in the receiver of FIG. 2, together with the suffix a. In many respects the circuit configuration of FIG. 3 will be seen to be similar to that of FIG. 2. However, the matched filter 42a provides control outputs only to clock controllers 54a and 64a in the embodiment of FIG. 3. Moreover, the mixer 48a does not provide an output to the mixer 62a, but feeds only the matched filter 42a. An additional mixer circuit 68 is interposed between pseudo-noise generator 60a and mixer 62a and receives a carrier frequency f″, whereas mixer 32a receives a carrier frequency f′. Moreover, an additional combining circuit means in the form of an exclusive-OR gate or circuit 70 receives the pseudo-noise signals of both generators 50a and 60a and feeds its output, which is equivalent to the diagonal or t-axis signal discussed above with reference to FIG. 5, to the mixer 68.

Referring briefly to FIG. 4, similar elements and components to those shown in the embodiments of FIG. 2 and FIG. 3 are indicated by like reference numerals with suffix b. In the embodiment of FIG. 4, the matched filter circuit 42 takes the form of respective bandpass filter (BPF) circuits 72, 74 and associated SAW correlator circuits 76, 78. Also, additional mixer circuits 80, and 82 are provided as illustrated and an additional bandpass filter (BPF) circuit 84 is interposed prior to the input of the receiving system 66b.

Briefly, the two pseudo-noise signals from generators 50b and 60b are fed to an exclusive-OR gate or circuit 70b and then to mixer 68b and mixer 82b, which respectively additionally receive a third carrier frequency f‴ and the input from the antenna 46b. In other respects, the circuit of FIG. 4 is functionally similar to the circuit of FIG. 3, in that the matched filters comprising bandpass filters and SAW correlators are essentially "cross-coupled" between the clock controller circuits 54b and 64b associated with respective pseudo-noise generators 50b and 60b. That is, the output of mixer 62b associated with generator 60b is combined with the signal received at antenna 46b and mixer 48b which feeds the bandpass filter 74 and SAW correlator 78, whose output feeds clock controller 54b and the other pseudo-noise generator 50b. Conversely, the mixer 52b associated with pseudo noise generator 50b feeds a mixer 80 which also receives the "received" signal from antenna 46b. The latter mixer 80 then feeds the bandpass filter 72 and SAW correlator 76 which in turn feed a control output signal to the second clock controller 60b and second pseudo noise generator 64b.

Figure 6:
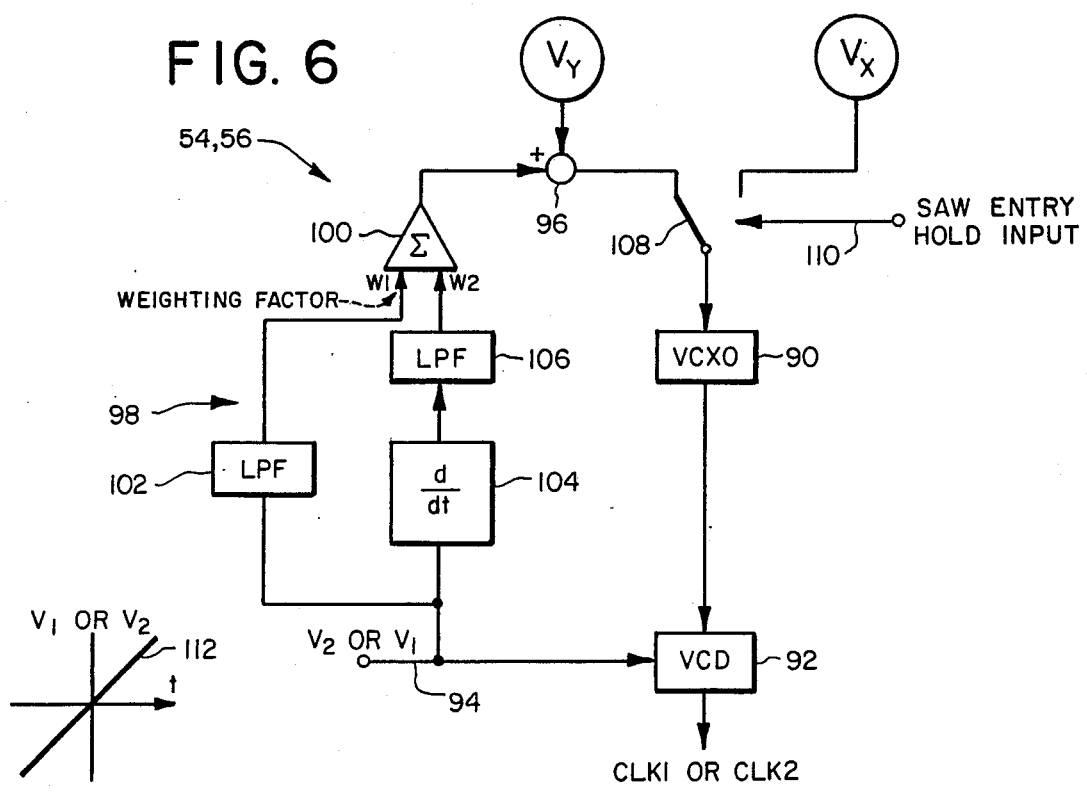
FIG. 6 is a block diagram of a clock signal generator circuit in accordance with one form of the invention.

Referring now to FIG. 6, an exemplary clock controller circuit which may be utilized as either or both of clock controller circuits 54 and 64 of the receiver of FIG. 2, as well as the corresponding circuits of the receivers of FIGS. 3 and 4, is illustrated. This clock controller circuit comprises a voltage controlled oscillator (VCO) 90, preferably a crystal oscillator (VCXO), for producing an output signal whose frequency is determined by the voltage of an input signal applied thereto. A voltage controlled delay circuit (VCD) 92 produces a time delay determined by a control voltage "V2 or V1" applied thereto. The time delayed output signal from the VCD 92 forms either the CLK1 or the CLK2 signal. The control voltage 92 (V2 or V1) is also fed to a summing junction 96 by way of a weighting circuit arrangement 98. In operation, this weighting circuit feeds a pair of weighted voltages or weighting factors W1 and W2 to a summing amplifier 100 whose output feeds the summing junction 96. The weighting factors W1 and W2 are developed from the selected control voltage V2 or V1 by a pair of parallel networks, the first of which comprises a low pass filter 102 and the second of which comprises the series combination of a differentiating circuit 104 and a low pass filter 106.

First and second control voltages for the VCXO 90 are indicated by reference characters Vx and Vy, either of which is selectable as the control voltage for VCXO 90 by operation of a switching means 108. The control voltage Vy is summed at the summing junction 96 with the weighting factor developed as described above. The switching means or switch 108 is operated by a SAW entry hold input signal indicated at reference numeral 110.

The general form of voltages V1 or V2 are indicated graphically at the lower left-hand portion of FIG. 6, and designated generally by reference numeral 112, and it will be seen that the voltage 112 comprises a ramp voltage signal.

Figure 7:
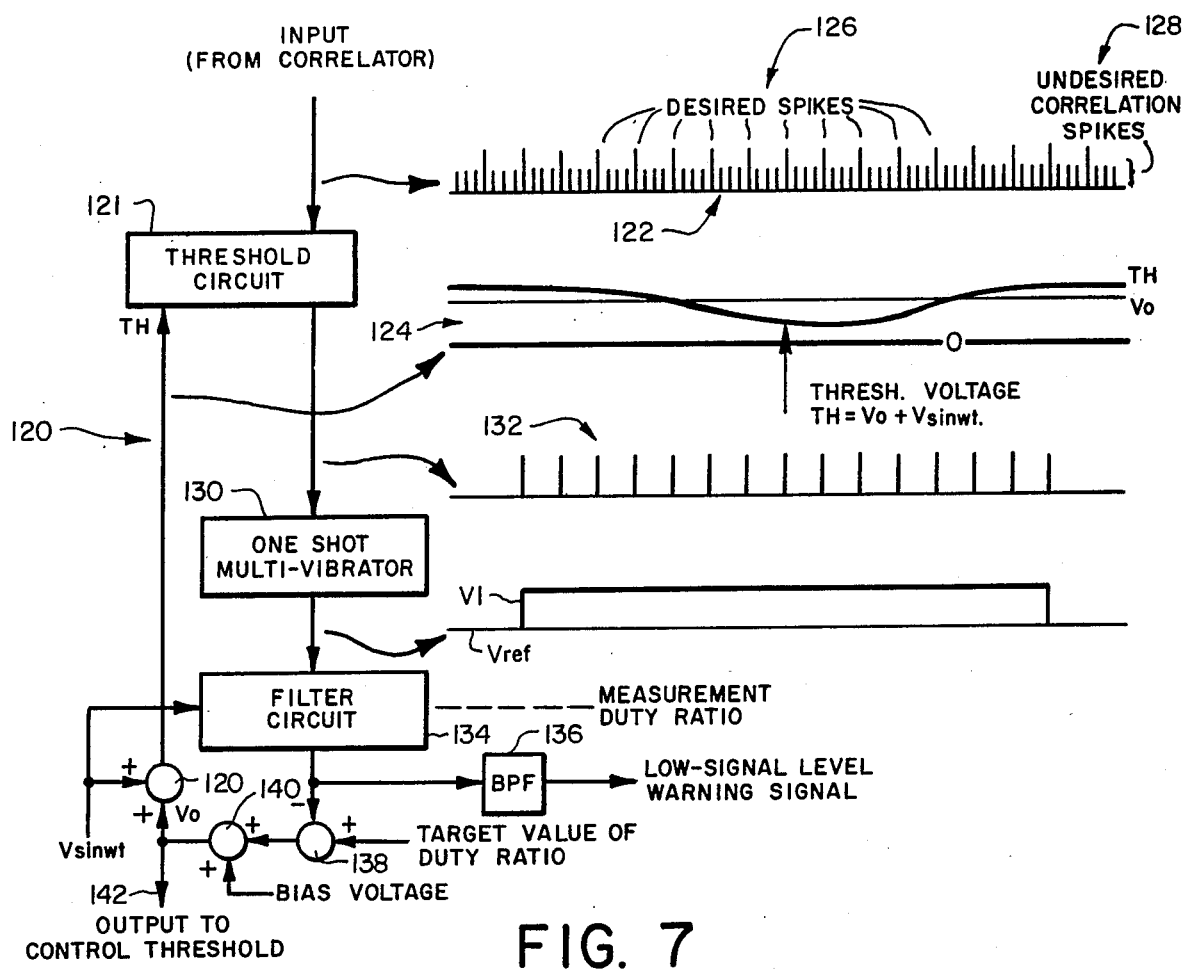
FIG. 7 is a block diagram of a modulation code correlator threshold controller circuit, with accompanying exemplary graphical representations of signals at various points in the circuit, in accordance with a preferred form of the invention.

Referring now to FIG. 7, a modulation code correlator threshold controller circuit is illustrated, together with an exemplary graphical representation of signals developed at various points in the circuit, in order to illustrate operation thereof. The threshold controller circuit 120 includes a threshold circuit 121 which receives an input signal from the correlator portion of the receiver circuit, as described above. Briefly, the purpose of the circuit of FIG. 7 is to avoid response of the receiver to undesired correlations between the pseudo-noise codes or signals of the transmitter and receiver which may occur due to autocorrelation side lobes during particularly strong signal reception. That is, when the received signal is particularly strong or at a high level, the relatively smaller and undesired side lobes (see FIGS. 12 and 13 and foregoing description thereof) may be sufficiently strong to cause "false" correlation or undesired correlation signals or spikes.

Accordingly, the threshold controller circuit 120 of FIG. 7 is intended to essentially remove the undesired correlation spikes from the system. In this regard, the threshold circuit 121 responds to a threshold level control signal TH. Both the desired spikes and undesired spikes of the correlation signals from the correlator of any of FIGS. 2, 3 or 4 are fed to the threshold circuit 121 and take a form of a series of spikes as exemplified by the adjacent "input" graph. The threshold level of circuit 121 is selected in accordance with a variable threshold control voltage TH, an example of which is indicated in graph 124. In the illustrated embodiment, the threshold voltage takes the general form Vo plus Vsinwt, which two voltages are applied at a summing junction 126 and then to the threshold control input TH of the threshold circuit 120.

The threshold circuit operates to select only the desired spikes 126 and eliminate the undesired correlation spikes 128, transmitting the former, desired spikes to a one shot multi-vibrator circuit 130, as indicated generally by the graph 132. The one shot multi-vibrator has a duty cycle such that if spikes of graph 132 are sufficiently closely spaced a continuous voltage V1 will be produced, which voltage has some predetermined value above a reference point Vref. The output of the one shot multi-vibrator 130 is fed to a filter circuit 134 which essentially permits measurement of the duty cycle or duty ratio of the output of the one shot. This filter circuit feeds out a low-level warning signal by way of a further bandpass filter (BFP) 136. The output of the filter circuit 134 is also utilized as a negative input to a summing junction 138 which also receives a positive input comprising a target value of the duty ratio of the one shot ouput. The sum of these two signals or voltages is fed to a further summing junction 140 where it is further combined with a bias voltage to form the above-mentioned threshold control voltage component Vo. This control voltage component Vo is also utilized as an output 140 to control the threshold in a further threshold circuit which will be illustrated and described hereinbelow in reference to FIG. 10.

Figure 8:
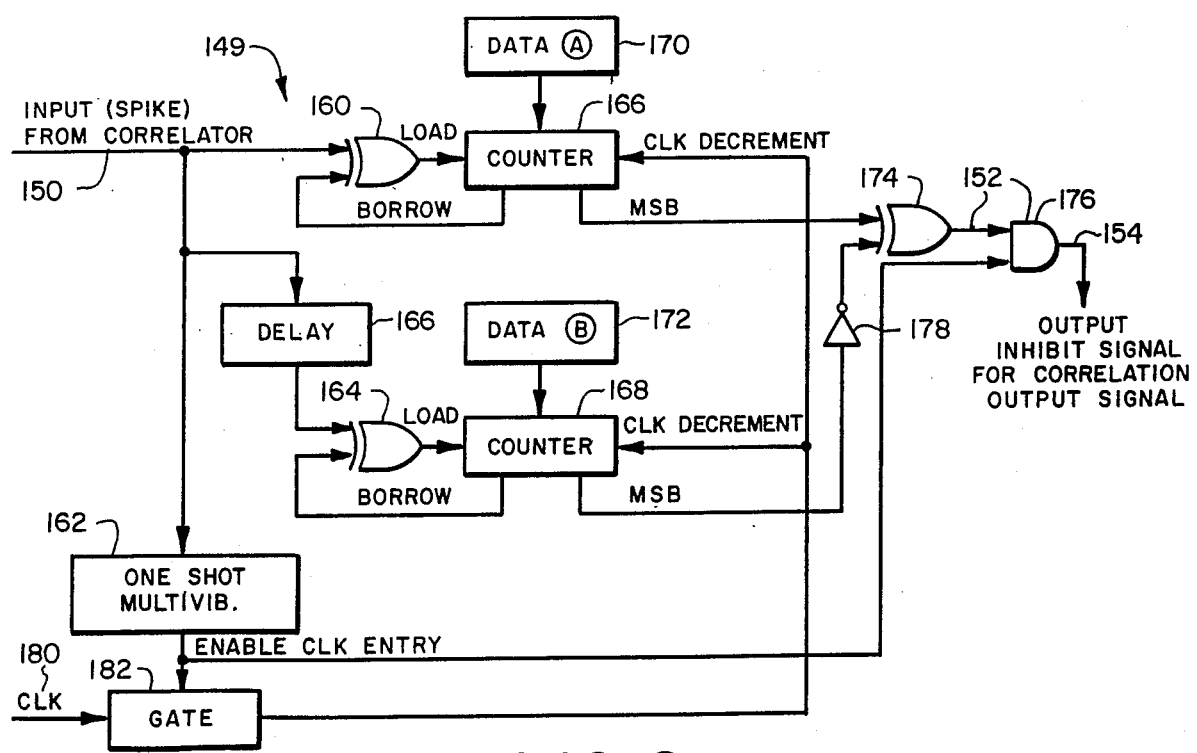
FIG. 8 is a block diagram illustrating further details of a preferred form of modulator code correlator signal inhibit circuitry.

Referring now to FIG. 8, further details of a preferred form of modulator code correlator signal inhibit circuit is illustrated. This circuit also receives the correlation "spike" inputs from the correlator circuit. for example of the form indicated at 122 in the graph of FIG. 7. The operation of this inhibit signal circuit is generally to inhibit correlation output signals so as to further limit response of the receiver to the so-called "desired" correlation spikes 126 discussed above. The operation of the circuit of FIG. 8 is indicated generally by the several graphs of FIG. 9, which illustrate exemplary signals at various points in the circuit.

Figure 9:
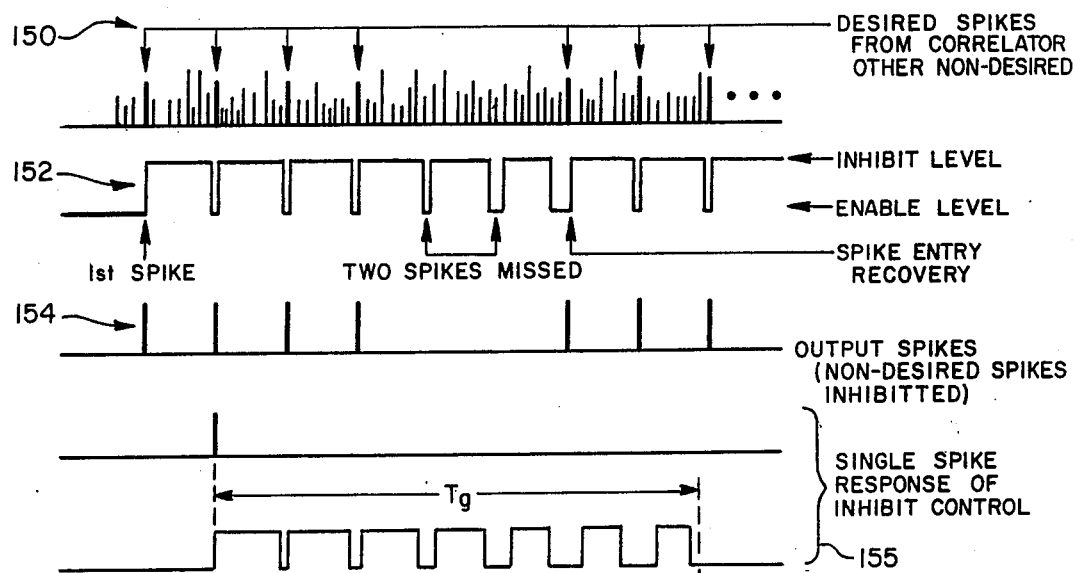
FIG. 9 is a graphical illustration of signals at given points in the circuit of FIG. 8.

Referring briefly to FIG. 9, it will be assumed that these desired spikes from the correlator are as indicated in graph 150. It will be noted that unlike the threshold circuit described above with reference to FIG. 7, wherein the desired spikes were of all of relatively greater magnitude than the undesired spikes, so as to be passed by the threshold circuit, the "desired spikes" of graph 150 may or may not be of greater magnitude than the undesired or "non-desired" spikes. Hence, the circuit of FIG. 8 operates in a suitable fashion to produce "enable" and "inhibit" signal levels so as to select only the "desired spikes". Generally speaking, the "desired spikes" indicated in graph 150 occur at well-defined time intervals. Accordingly, the "inihibit and enable" signal generally comprises a pulse string as indicated at graph 152 having a controlled duty cycle, such that the "enable level" portions are controlled to coincide in time with the occurence of the "desired spikes". This enable/inhibit signal may be applied to a gating circuit, such that the output comprises essentially only the desired spikes, as indicated in graph 154.

Referring again to FIG. 8, the correlator signal 150 with both desired and undesired signal spikes is applied at the like-designated input of the circuit. These correlator signals are fed to an exclusive-OR gate or circuit 160 and also to a one-shot multi-vibrator 162. A second, similar exclusive-OR gate or circuit 164 also receives the correlator signal 150, and an additional delay circuit 166 may be additionally interposed in the input to the exclusive-OR circuit 164. The two exclusive-OR circuits are arranged to increment the count respective counter circuits 166 and 168, which also receive data entries from respective associated data A and B circuits 170 and 172. The most significant bit (MSB) of each of counters 166 and 168 is fed to a further exclusive-OR circuit 174 which develops the output inhibit signal therefrom by way of a two-input AND circuit or gate 176. The MSB output of counter 168 is fed to exclusive-OR gate 174 by way of an inverter buffer 178.

A clock decrement signal is fed to each of the counters 166 and 168 from a clock (CLK) signal input 180 by way of a gate circuit 182. A control signal for gate 182 is developed by the one-shot multi-vibrator 162. This control signal is referred to as the enable CLK entry signal and is also fed to the second or control input of the two-input and gate 176 at the output of the circuit. Accordingly, the circuit of FIG. 7 develops the signals indicated in FIG. 9, as generally indicated at reference numerals 152 and 154.

A "single spike," response of the inhibit control circuit is also illustrated in the final graph 155 of FIG. 9. In this regard, it will be noted that a single spike initially causes the duty cycle signal substantially of the form shown at the initial or left-hand portion of the graph 152. However, in the absence of further correlation spikes, the duty cycle of the signal gradually decreases, thereby increasing the time during which the enable level is produced in succeeding cycles. This respective decreasing of the duty cycle and increasing of the enable signal length is also illustrated in graph 152 wherein the effect of two "missed" spikes, and the succeeding spike entry recovery of the initial duty cycle are illustrated.

Figure 10:
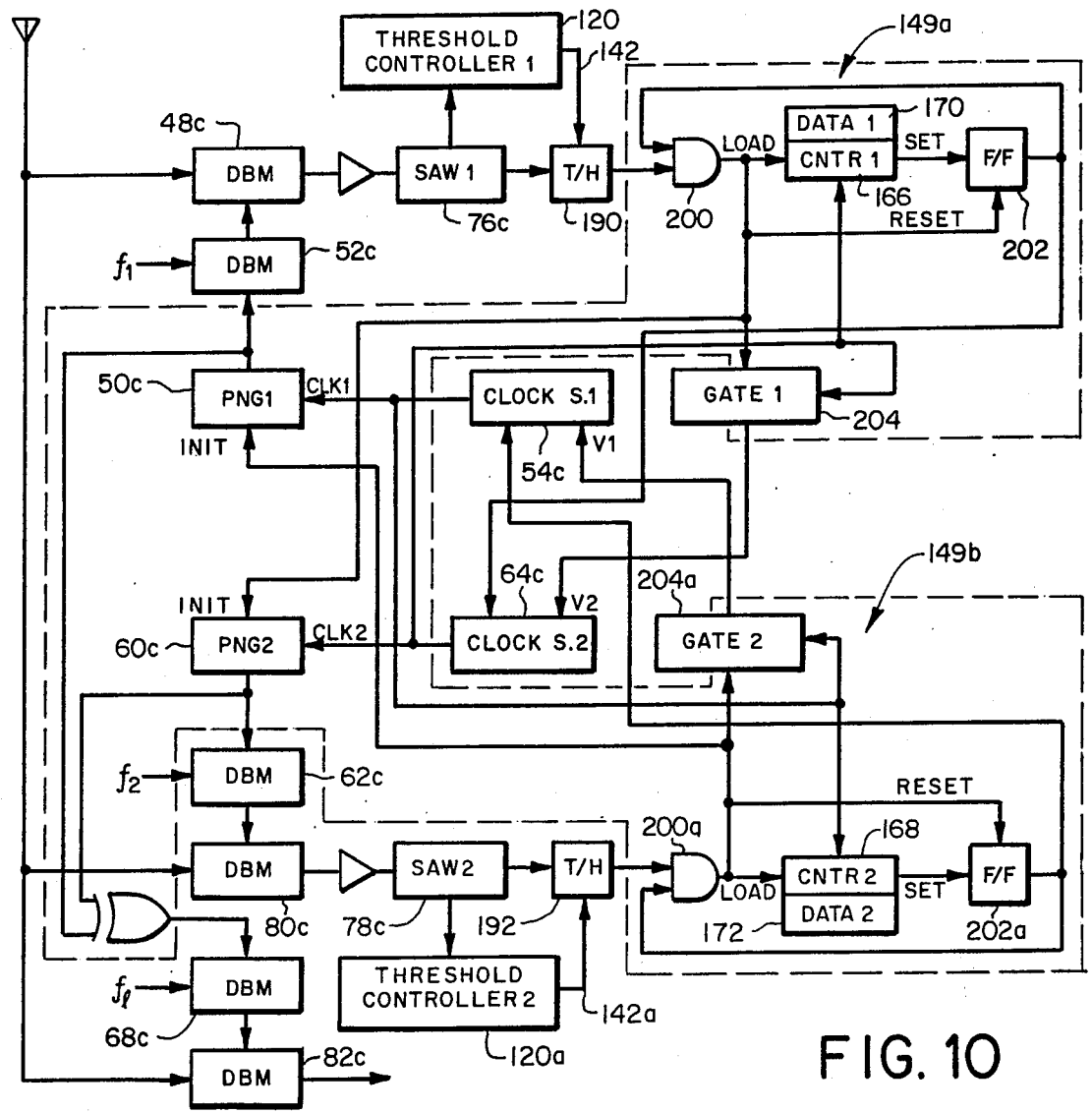
FIG. 10 is a block diagram showing additional details of a receiver portion of the communication system in accordance with a preferred form of the invention.

Referring now to FIG. 10, further details of an exemplary receiver circuit, utilizing the respective clock signal generation, threshold controller and signal inhibit circuits and operations thereof described above with reference to FIGS. 6-9, is illustrated. In this regard, like reference numerals to those utilized in FIGS. 2-4, together with subscript c, designate like elements and components of the receiver circuit of FIG. 10. The same reference numerals utilized in FIGS. 6 and 8 are utilized to designate the like portions of the circuit of FIG. 10.

The receiver circuit illustrated in FIG. 10 is substantially the same as that illustrated and described above with reference to FIG. 4, with the addition of circuits generally of the form of the circuits of FIGS. 6 and 8 as described above. Accordingly, it is believed that further description of operation of this circuit of FIG. 10 is unnecessary. The inhibit circuit has been shown in two parts 149a and 149b (in somewhat modified form) at the outputs of additional threshold circuits 190, 192 which are controlled by respective threshold controller circuits 120 and 120b. In this regard, and referring only to circuit 149 of FIG. 10, the output of threshold circuit (T/H) 190 feeds one input of a two-input AND gate or circuit 200 which loads counter 166a. Data from the associated data circuit 170a also feeds counter 166a, as described above with reference to FIG. 8. The counter provides a set input into a flip-flop (F/F) circuit 202 whose reset is coupled to receive the load or increment signal from gate 200. The output of flip-flop 202 is fed back to the second input of AND gate 200 and also to the control input of the clock circuit 64c associated with second pseudo-noise generator circuit (PNG2) 60C. The decrement signal for the counter 166 is the output CLK2 of this same clock controller circuit 64c, which signal is also applied to one control input of the corresponding gate circuit (GATE 1) 204. The other control input to the gate circuit 204 is the load signal from AND gate 200. The second inhibit circuit portion 149b is substantially identical to circuit portion 149a and need not be described in further detail.

Figure 11:
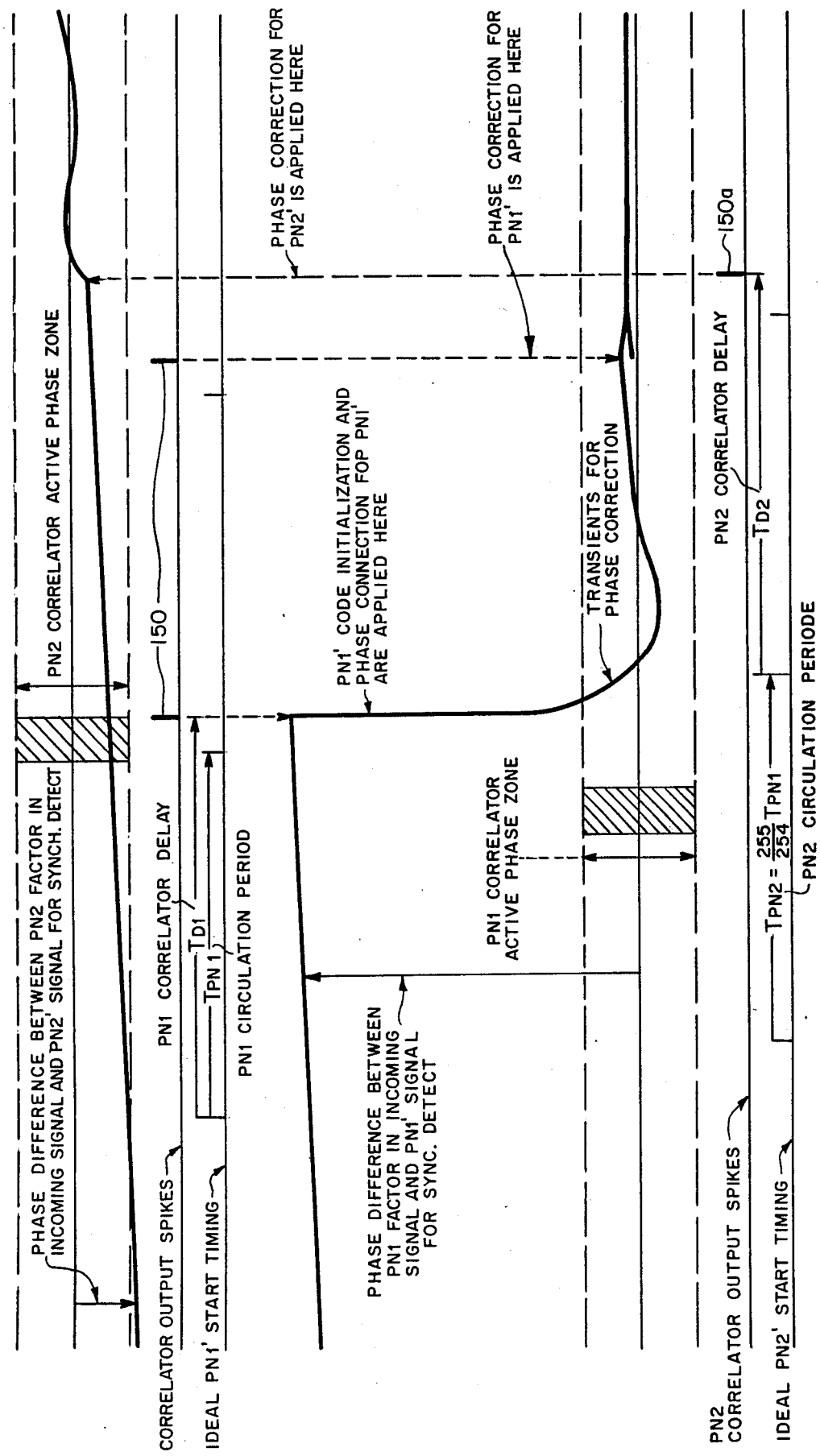
FIG. 11 is a further graphical representation of an intial acquisition process timing chart for the receiver circuit of FIG. 10.

Referring briefly to FIG. 11, the operation of the receiver circuit described above with reference to FIG. 10 is shown in graph form. It will be appreciated from the foregoing discussion that the circuit has two substantially similar portions or halves, each characterized by one of the pseudo-noise generator circuits. The pseudo-noise signals or codes generated by these two circuits are combined as discussed above to form the desired combined pseudo-noise decoding signal to correspond to the signal utilized in the encoding process at the spread spectrum transmitter. In particular, FIG. 11 indicates the timing of the respective pseudo-noise signals PN1 and PN2 including their circulation periods TPN1 AND TPN2 and their correlator delay periods TD1 and TD2, respectively. It will be noted that in the example illustrated in FIG. 11 the circulation period of the PN2 code is 255/254 of the circulation period of the PN1 code. The PN1 and PN2 signals in the incoming received signal (that is, those generated by the transmitter) are compared with the ideal or expected codes which are here designated as PN1' and PN2'. It can be expected that the signals will be somewhat out of phase, whereby a phase difference between the respective incoming and ideal signals is also indicated in the example given in FIG. 11. The respective correlator "active" phase zones are indicated by double arrows and corresponding shaded areas in the graph. The point at which code initialization and phase correction for the PN1' pseudo-noise signal takes place is also indicated by reference numeral 150. This corresponds to the so-called desired correlation spikes of the graph of FIG. 9. The PN2' phase correction and correlation spike, which occurs somewhat later in time in the graph of FIG. 11, is indicated by reference numeral 150a.

While particular embodiments of the invention have been shown and described, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The Invention is claimed as follows:

1. A pseudo-random communication system in which a transmitter-generated encoded signal is to be correlated with a receiver-generated similarly encoded signal for recognizing synchronization of the transmitted and received signals in the presence of undesired received energy, said system comprising: a spread-spectrum transmitter including at least two pseudo-noise generators for producing at least two pseudo-noise signals which are related by a ratio slightly removed from unity mixing means for receiving and mixing said two pseudo-noise signals with respective carrier and information signals to produce an output signal, and means for transmitting the output signal; and a spread-spectrum receiver comprising correlator means and matched filter means coupled in circuit to form synchronization detector circuit means for receiving and detecting the encoded output signal transmitted by said transmitter means so as to recover the information therefrom; said correlator means including at least one pseudo-noise generator means for producing pseudo-noise signals related in a predetermined fashion to the pseudo-noise signals produced by the transmitter pseudo-noise generators and mixer means for mixing said pseudo-noise signals with the received encoded output signals and coupled in circuit with said matched filter circuit means.

2. A system according to claim 1 wherein said transmitter circuit means further comprises a first mixer coupled to receive and mix the pseudo-noise signals from said at least two pseudo-noise generators with a carrier signal to provide a first mixer signal, and a second mixer circuit coupled to receive and mix said first mixer signal with an information signal to provide said encoded output signal.

3. A system according to claim 1 wherein said correlator means comprises a sliding correlator comprising at least one pseudo-noise generator for producing said pseudo-noise signal in accordance with a clock signal input applied thereto, and further including clock controller circuit means for producing said clock signal input for said pseudo-noise generator.

4. A system according to claim 1 wherein said matched filter circuit means comprises a bandpass filter circuit and a SAW correlator circuit.

5. A system according to claim 1 wherein said synchronization detector circuit means comprises a correlator circuit means including at least two pseudo-noise generator circuits, and associated mixer circuits and clock controller circuit means for producing clock signals for driving each of said two pseudo-noise generator circuits; said clock controller circuit means being coupled in circuit for producing respective clock signals in response to predetermined output signals of said matched filter circuit means.

6. A system according to claim 5 wherein the output of at least one of said mixer circuits is coupled in circuit for driving said matched filter circuit means; said second mixer circuit being coupled in circuit providing a decoded signal output for further processing by further radio receiving circuit means.

7. A system according to claim 3 wherein said clock controller circuit means comprises a voltage controlled oscillator for producing an output signal having a frequency determined by the voltage of an input signal applied thereto; a voltage controlled delay circuit coupled to said voltage controlled oscillator circuit for applying a time delay to the oscillator output signal determined by a second control voltage applied thereto; sources of first and second control voltages for said voltage controlled oscillator and switching means for selecting between said first and second control voltages; source of a third, selectable control voltage coupled for applying the same to said voltage controlled delay circuit; voltage summing circuit means coupled intermediate one of said first and second control voltage sources and said switching means; and weighting circuit means coupled intermediate said third control voltage source and said summing circuit means.

8. A system according to claim 7 wherein said switching means comprises a controllable switching means responsive to synchronization detection in said receiver circuit for switching between said first and second control voltages for application to said voltage-control oscillator, said first control voltage comprising a base voltage for controlling a sliding correlation circuit and said second control voltage comprising a voltage to hold said sliding correlation circuit in synchronization following synchronization detection.

9. A system according to claim 8 wherein said third control voltage, applied to said voltage-controlled delay circuit, comprises a ramp voltage signal.

10. A system according to claim 1 wherein said receiver circuit means further comprises modulation code correlator threshold controller circuit means comprising oscillator circuit means for producing an oscillatory output signal at a selected frequency; summing circuit means; filter circuit means coupled to receive said oscillator circuit output signal; threshold circuit means coupled to receive an output of said correlator means and the summed output of said summing circuit means as a threshold control signal; multivibrator circuit means coupled intermediate a threshold output voltage of said threshold circuit and an input of said filter circuit; an output of said filter circuit being used as a low signal level warning signal and also being fed back to an input of said summing circuit means.

11. A system according to claim 3 wherein said receiver circuit further includes a modulator code correlator signal inhibit circuit comprising a selectively activatable correlator signal inhibitor circuit and a time counting circuit responsive to a single correlator signal entry for activating said correlator signal inhibitor following a predetermined time delay.

12. A method for producing a pseudo-noise signal for use in transmitting and receiving encoded signals in a pseudo-random communication system, said method comprising: producing at least two pseudo-noise signals which are related in a predetermined fashion, said two different pseudo-noise signals having a predetermined relationship between their chip rates, said chip rates thereof being related by ratio slightly removed from unity, and combining said two pseudo-noise signals in a predetermined fashion to form a composite signal for use in encoding and decoding information in said pseudo-random communications system.

13. A method according to claim 12 wherein the two pseudo-noise signals are 15-bit length M-series codes and wherein clocks are used for chip timing of the two pseudo-noise rates, said clocks having a frequency ratio of substantially 29/30.

14. The method according to claim 12 wherein the two pseudo-noise code circulation periods are related in the following fashion:

$$0.2 \leq \eta \leq 1.5$$

$$\eta = \frac{|M1Tpc1 - M2Tpc2| \times 2}{\left(\frac{n1Tc1 + n2Tc2}{(n1 + n2)}\right)(M1 + M2)}$$

Where M1, M2, n1 and n2 are all independent integers, equal to 1, 2 or 3.
and where
  Tc1 and Tpc1 are the chip time and code circulation period for the first pseudo-noise code,
  Tc2 and Tpc2 are the chip time and code circulation period for the second pseudo-noise code.

15. The method according to claim 14 wherein the two pseudo-noise code circulation periods are relation as follows:

$$\eta = \frac{|Tpc1 - Tpc2|}{\left(\frac{Tc1 + Tc2}{2}\right)} = \frac{\text{difference between two PN code circulation periods}}{\text{mean chip time}}$$

16. A pseudo-random communication system in which a transmitter-generated encoded signal is to be correlated with a receiver-generated similarly encoded signal for recognizing synchronization of the transmitted and received signals in the presence of undesired received energy, said system comprising: a spread-spectrum transmitter including at least two pseudo-noise generators for producing at least two pseudo-noise signals which are related in a prdetermined fashion, mixing means for receiving and mixing said two pseudo-noise signals with respective carrier and information signals to produce an output signal, and means for transmitting the output signal; and a spread-spectrum receiver comprising correlator means and matched filter means coupled in circuit to form synchronization detector circuit means for receiving and detecting the encoded output signal transmitted by said transmitter means so as to recover the information therefrom; said correlator means including at least one pseudo-noise generator means for producing pseudo-noise signals related in a predetermined fashion to the pseudo-noise signals produced by the transmitter pseudo-noise generators and mixer means for mixing said pseudo-noise signals with the received encoded output signals and coupled in circuit with said matched filter circuit means wherein the two pseudo-noise signals are 15-bit length M-series codes and wherein clocks are used for chip timing of the two pseudo-noise rates, said clocks having a frequency ratio of substantially 29/30.

17. A pseudo-random communication system in which a transmitter-generated encoded signal is to be correlated with a receiver-generated similarly encoded signal for recognizing synchronization of the transmitted and received signals in the presence of undesired received energy, said system comprising: a spread-spectrum transmitter including at least two pseudo-noise generators for producing at least two pseudo-noise signals which are related in a predetermined fashion, mixing means for receing and mixing said two pseudo-noise signals with respective carrier and inforamtion signals to produce an output signal, and means for transmitting the output signal; and a spread-spectrum receiver comprising correlator means and matched filter means coupled in circuit to form synchronization detector circuit means for receiving and detecting the encoded output signal transmitted by said transmitter means so as to recover the information therefrom; said correlator means including at least one pseudo-noise generator means for producing pseudo-noise signals related in a predetermined fashion to the pseudo-noise signals produced by the transmitter pseudo-noise generators and mixer means for mixing said pseudo-noise signals with the received encoded output signals and coupled in circuit with said matched filter circuit means;
  wherein the two pseudo-noise signals have code circulation periods which are related in the following fashion:

$$0.2 \leq \eta \leq 1.5$$

$$\eta = \frac{|M1Tpc1 - M2Tpc2| \times 2}{\left(\frac{n1Tc1 + n2Tc2}{(n1 + n2)}\right)(M1 + M2)}$$

where M1, M2, n1 and n2 are all independent integers, equal to 1, 2 or 3
and where
  Tc1 and Tpc1 are the chip time and code circulation period for the first pseudo-nose code, and
  Tc2 and Tpc2 are the chip time and code circulation period for the second pseudo-noise code.

18. A method for producing a pseudo-noise signal for use in transmitting and receiving encoded signals in a pseudo-random communication system, said method comprising: producing at least two pseudo-noise signals which are related in a predetermined fashion, said two different pseudo-noise signals having a predetermined relationship between their chip rates, said chip rates thereof being related by ratio slightly removed from unity, and combining said two pseudo-noise signals in a predetermined fashion to form a composite signal for use in encoding and decoding information in said pseudo-random communications system; wherein the two pseudo-noise signals are 15-bit length M-series codes and wherein clocks are used for chip timing of the two pseudo-noise rates, said clocks having a frequency ratio of substantially 29/30.

19. A method for producing a pseudo-noise signal for use in transmitting and receiving encoded signals in a pseudo-random communication system, said method comprising: producing at least two pseudo-noise signals which are related in a predetermined fashion, said two different pseudo-noise signals havign a predetermined relationship between their chip rates, said chip rates thereof being related by ratio slightly removed from unity, and combining said two pseudo-noise signals in a predetermined fashion to form a composite signal for use in encoding and decoding information in said pseudo-random communications system; wherein the two pseudo-noise signals having code circulation periods which are related in the following fashion:

$$0.2 \leq \eta \leq 1.5$$

$$\eta = \frac{|M1Tpc1 - M2Tpc2| \times 2}{\left(\frac{n1Tc1 + n2Tc2}{(n1 + n2)}\right)(M1 + M2)}$$

where M1, M2, n1 and n2 are all indepenedent integers, equal to 1, 2 or 3
and where Tc1 and Tpc1 are the chip time and code circulation period for the first pseudo-noise code, and Tc2 and Tpc2 are the chip time and code circulation period for the second pseudo-noise code.

20. A pseudo-random communication system in which a transmitter-generated encoded signal is to be correlated with a receiver-generated similarly encoded signal for recognizing synchronization of the transmitted and received signals in the presence of undesired received energy, said system comprising: a spread-spectrum trnasmitter including at least two pseudo-noise generators for producing at least two pseudo-noise signals which are related in a predetermined fashion, mixing measn for receiving and mixing said two pseudo-noise signals with respective carrier and information signals to produce an output signal, and means for transmitting the output signal; and a spread-spectrum receiver comprising correlator means and matched filter means coupled in circuit to form synchronization detector circuit means for receiving and detecting the encoded output signal transmitted by said transmitter means so as to recover the information therefrom; said correlator means including at least one pseudo-noise generator means for producing pseudo-noise signals related in a predetermined fashion to the pseudo-noise signals produced by the transmitter pseudo-noise generators and mixer means for mixing said pseudo-noise signals with the received encoded output signals and coupled in circuit with said matched filter circuit means; wherein the two pseudo-noise signals are multiple-bit length M-series codes and wherein first and second clocks are used for chip timing of the tow pseudo-noise rates, said first and second clocks having a predetermined frequency ratio slightly less than unity.

21. A method for producing a pseudo-noise signal for use in transmitting and receiving encoded signals in a pseudo-random communication system, said method comprising: producing at least two pseudo-noise signals which are related in a predetermined fashion, said two diffrent pseudo-noise signals having a predetermined relationship between their chip rates, said chip rates thereof being related by ratio slightly removed from unity, and combining said two pseudo-noise signals in a predetermined fashion to form a composite signal for use in encoding and decoding information in said pseudo-random communications system; wherein the two pseudo-noise signals are mulitiple-bit length M-series codes and wherein first and second clocks are used for chip timing of the two pseudo-noise rates, said first and second clocks having a predetermined frequency ratio slightly less than unity.

* * * * *